United States Patent
Savage et al.

(10) Patent No.: US 7,074,329 B2
(45) Date of Patent: Jul. 11, 2006

(54) LID FOR AN UNDERDRAIN BLOCK

(75) Inventors: E. Stuart Savage, Brunswick, ME (US); David C. Slack, Tampa, FL (US)

(73) Assignee: Tetra Technologies, div Capital Controls, Severn Trent Services Co., Tampa, FL (US)

( * ) Notice: Subject to any disclaimer, the term of this patent is extended or adjusted under 35 U.S.C. 154(b) by 583 days.

(21) Appl. No.: 10/055,238

(22) Filed: Oct. 26, 2001

(65) Prior Publication Data

US 2003/0080040 A1    May 1, 2003

(51) Int. Cl.
*B01D 24/12* (2006.01)
*B01D 24/22* (2006.01)

(52) U.S. Cl. ..................... 210/293; 210/541
(58) Field of Classification Search ............... 210/289, 210/291, 293, 541
See application file for complete search history.

(56) References Cited

U.S. PATENT DOCUMENTS

| | | | |
|---|---|---|---|
| 667,005 A | 1/1901 | Davis | 210/293 |
| 1,891,061 A | 12/1932 | Friend et al. | 210/286 |
| 2,263,964 A | 11/1941 | Camp | 210/293 |
| 2,267,918 A | 12/1941 | Hildabolt | 428/547 |
| 3,178,026 A | 4/1965 | Christy | 210/293 |
| 4,206,845 A * | 6/1980 | Christian | 206/508 |
| 4,564,450 A | 1/1986 | Piper et al. | 210/293 |
| 4,783,261 A | 11/1988 | Lingle | 210/290 |
| 4,882,053 A | 11/1989 | Ferri | 210/293 |
| 4,887,735 A * | 12/1989 | Dudzik | 220/789 |
| 4,923,606 A * | 5/1990 | Gresh et al. | 210/275 |
| 5,149,427 A * | 9/1992 | Brown et al. | 210/274 |
| 5,232,592 A | 8/1993 | Brown et al. | 210/274 |
| 5,269,920 A | 12/1993 | Brown et al. | 210/274 |
| 5,468,273 A | 11/1995 | Pevzner et al. | 55/523 |

FOREIGN PATENT DOCUMENTS

FR    541011    9/1921
FR    2554009   10/1983

* cited by examiner

*Primary Examiner*—Ivars C. Cintins
(74) *Attorney, Agent, or Firm*—D'Ambrosio & Associates, PLLC; Jo Katherine D'Ambrosio

(57) ABSTRACT

A lid for an underdrain block that has a top surface defining an opening for receiving fill material. The top surface forms a ridge circumscribing the opening, the lid comprising a top, a bottom and a peripheral edge, the peripheral edge comprising a rim adapted to interlock with the ridge. The ridge of the underdrain block can have a flange perpendicular to the top surface and the rim on the lid is adapted to tightly fit over the flange so that the rim interlocks with the flange. Alternatively, the underdrain block for a filter system comprises a hollow plastic housing comprising a top wall that defines an opening for receiving the fill material. The top wall forms a ridge surrounding the opening and the lid seals the opening in the top wall. The lid comprises a peripheral edge that forms a u-shaped rim. The u-shaped rim has a locking means to tightly fit over the ridge so that the rim interlocks with the ridge so as to seal the opening.

7 Claims, 3 Drawing Sheets

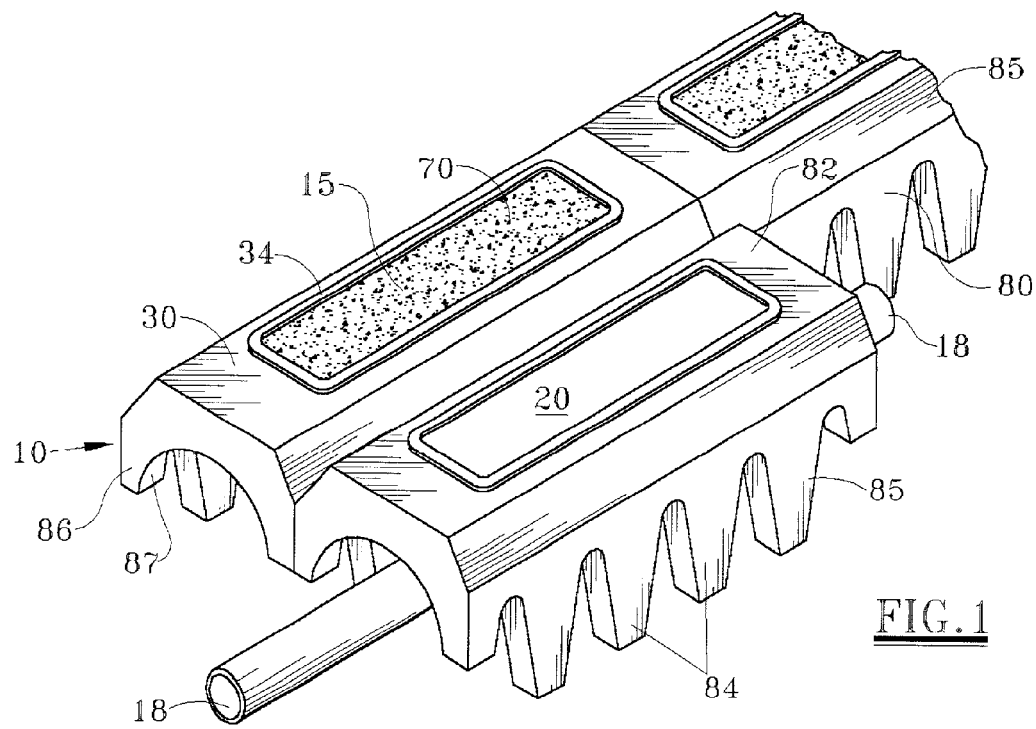
FIG.1
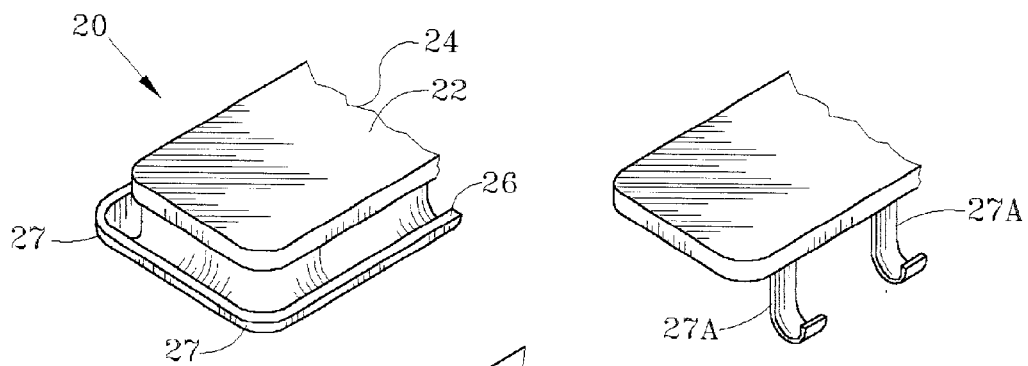
FIG.2
FIG.2A
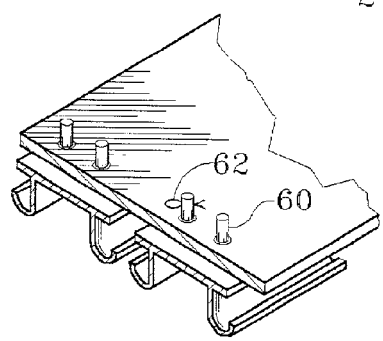
FIG.7

LID FOR AN UNDERDRAIN BLOCK

FIELD OF THE INVENTION

The present invention relates to a lid for an underdrain block used in a water treatment or wastewater treatment filter. More specifically the invention relates to a lid for a hollow underdrain block used to seal the underdrain block after it has been filled with fill material. The fill material can be sand, gravel or concrete.

BACKGROUND OF THE INVENTION

Water, wastewater and industrial liquid granular filtration units typically have a filter media support system that separates the filter media from the underdrain system and filter bottom. The underdrain system is the primary support for the filter media, and also serves to collect the filtrate and provide for the uniform distribution of air and water during the backwash of the filter system. Because high pressure air and water backwash are an important part of the filter system, underdrain blocks must be heavy enough so as not to move or shift during backwash. Typically, underdrain blocks have been precast from high strength concrete and the blocks set in parallel rows in the bottom of the filter to provide support for the filter media and protection of the filter infrastructure of air laterals.

Underdrain systems are often made of concrete blocks having spaces to allow for piping, such as air laterals, that are part of the backwash air distribution system. A solid precast concrete, plastic-jacketed underdrain block is disclosed in U.S. Pat. No. 4,923,606 to Gresh. In the Gresh apparatus, the plastic jacket functions as a mold for concrete. French foreign reference 544,011 discloses a filter support surface support comprised of molded concrete slabs formed with a number of closely spaced fine holes to allow air and water through.

Brown, U.S. Pat. No. 5,149,427 discloses a cap for a filter underdrain block. The cap is a porous planar body of sintered polyethylene having pores in the range of 700–800 microns. The underdrain block comprises interior walls that define three conduits. In Brown U.S. Pat. No. 5,232,592, a continuation of Brown '427, discloses that the cap and the ribs on the top of the underdrain block define a plurality of distribution chambers above the orifices in the block.

Brown, U.S. Pat. No. 5,269,920, is also a continuation of the '427 reference. The top surface 12 of the cap includes a plurality of tapered, spaced screen members 20. Each screen member 20 defines a plurality of slots in the top surface 12. The slots are sized to provide fluid communication between the filter media and the distributor without passage of fine grain media therethrough.

U.S. Pat. No. 5,108,627 was given to Berkebile for a filter underdrain block. The '627 patent discloses a multi-chambered block having separate conduits for gas and liquids for a backwash cycle. The '627 reference also teaches that the block can be formed from molded, high-density polyethylene.

None of the underdrain blocks available prior to the present invention teach or suggest a block that can be weighted with a variety of materials that are available on site and sealed. What is needed is an underdrain block with a nonporous lid that allows the block to be filled with a multitude of materials that are on hand at the filter site to give greater mass to the underdrain block.

SUMMARY OF THE INVENTION

Underdrain blocks must be heavy enough to be able to withstand the upward pressure of air and water backwashes without moving and shifting during that phase of the filter process. Shipment of heavy underdrain blocks is costly. With the lid of this invention, the underdrain block can be shipped as a hollow housing and filled on site with any appropriate particulate or curable fill that is available. The cost of the block is limited to the hollow housing and the lid because the blocks can be filled with sand, gravel or dirt that is indigenous to the site. After filling the underdrain block, the non-porous lid of this invention advantageously closes off the filled cavity of the hollow block. In one preferred embodiment, the underdrain block includes a top surface that defines an opening for receiving fill material. The top surface preferably forms a ridge circumscribing the opening. In this embodiment, the lid comprises a top, a bottom and a peripheral edge. The peripheral edge comprises a rim adapted to interlock with the ridge. In one preferred embodiment, the ridge of the underdrain block can include a flange perpendicular to the top surface. In this embodiment the rim is adapted to tightly fit over the flange so that the rim interlocks with the flange. In one aspect, the flange is positioned within the opening of the underdrain block and the rim is configured to be positioned within the opening of the underdrain block to interlock onto the flange.

Alternatively, the flange is directed away from the opening of the underdrain block and the rim is adapted to be positioned over the ridge of the underdrain block to interlock onto the flange. The rim is preferably of a size that is adapted to snap lock onto the ridge when the lid is fitted within the opening of the underdrain block and it is preferred that the rim is sized to fit tightly onto the ridge. The rim can be u-shaped to define a channel; a sealing member can be fitted within the channel. The u-shaped rim comprises a locking means configured to tightly fit over the flange so that the rim interlocks with the flange. The lid preferably comprises a size to snap lock onto the ridge so as to tightly close the opening after fill material has been added to the block. The sealing member within the channel can comprise a bead of plastic sealing compound or alternatively, an o-ring. In one embodiment, the bottom of the lid comprises one or more protrusions for anchoring the lid in the fill material.

In another embodiment of this invention, an underdrain block for a filter system that has an infrastructure, the underdrain block comprises a hollow plastic housing, the housing comprising a top wall, a bottom wall, and ends walls and side walls connecting the top wall to the bottom wall, the bottom wall forming two lateral rows of support legs to provide for infrastructure. In this embodiment, the top wall defines an opening for receiving the fill material and forms a ridge surrounding the opening. This embodiment of the underdrain block further comprises a lid for sealing the opening in the top wall after the underdrain block has been filled with sand, gravel or concrete. The lid can comprise a top, a bottom, and a peripheral edge, the peripheral edge comprising a u-shaped rim. It is the u-shaped rim that can be a locking means to tightly fit over the ridge of the underdrain block so that that the rim interlocks with the ridge. Preferably, the lid comprises a size to snap lock onto the ridge so as to seal the opening.

In one aspect, the ridge of the underdrain block can comprise a flange perpendicular to the top surface and directed downward into the opening, and the rim comprises a size to fit tightly over the flange so that the rim interlocks with the flange. The u-shaped rim defines a channel and the rim further comprises a sealing member fitted within the channel to seal the rim onto the flange. In one embodiment, the bottom of the lid comprises one or more protrusions for anchoring the lid in the fill material.

In another preferred embodiment of this invention, a support system for supporting granular filter media above a filter bottom, the filter bottom having an infrastructure, comprises a layer of underdrain blocks placed over infrastructure of the filter bottom. Preferably, each underdrain block comprises a top and a bottom and further comprises a lid for sealing an opening in the block after the block has been filled with fillable material. In this embodiment, one or more porous plates are placed over the underdrain blocks to support the filter media. Anchoring means for securing the porous plates are necessary. In one embodiment the anchoring means comprise a lid that defines one or more bolt holes, a porous plate that defines one or more plate bolt holes aligned to the bolt holes of the lid and bolts threaded through the lid bolt holes and the porous plate bolt holes to secure the porous plate to the lid. Alternatively, the fill material can comprise threaded bolt holes so that a bolt can be inserted through the porous plate, the lid and screwed into the threaded bolt holes. In another aspect the anchoring means can be expandable anchors.

In an alternative embodiment of the support system for supporting granular filter media above a filter bottom, the filter bottom having an infrastructure, the support system comprises a layer of underdrain blocks placed over infrastructure of the filter bottom, each underdrain block comprising a top and a bottom and further comprising a lid, the lid defining one or more bolt holes. In this preferred embodiment, one or more porous plates are placed over the underdrain blocks to support the filter media. The porous plate can define one or more bolt holes aligned to the bolt holes of the lid; and one or more bolts are threaded through the lid bolt holes and the porous plate bolt holes to secure the porous plate to the lid.

BRIEF DESCRIPTION OF THE DRAWINGS

FIG. 1 is a perspective illustrating underdrain block and lid according to one embodiment of this invention.

FIG. 2 is a perspective view of a second embodiment of the lid.

FIG. 2A is a perspective view of a third embodiment of the lid.

FIG. 7 is a perspective view of the lid and the porous plate.

DETAILED DESCRIPTION OF THE INVENTION

Figure 3:
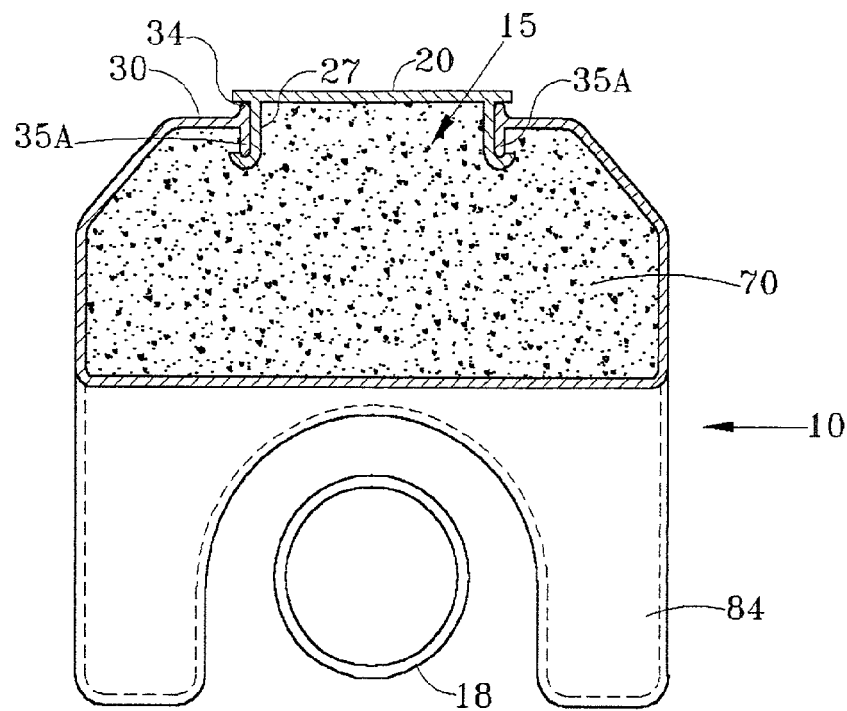
FIG. 3 is a partial cross-section of an underdrain block illustrating one embodiment of the ridge.

This invention is directed to a lid for an underdrain block used in a water treatment or wastewater filter. Typically, underdrain blocks must be weighted to be able to withstand the upward pressure of air and water backwashes without moving and shifting. Shipment of heavy underdrain blocks is costly. With the lid of this invention, the underdrain block can be shipped as a hollow housing and filled on site with any appropriate particulate or curable fill that is available. FIG. 1 illustrates both lidded and un-lidded underdrain blocks 10. One preferred embodiment of the lid 20 is used with a hollow underdrain block 10 that has a top surface 30. The top surface 30 has an opening 15 and cavity for receiving fill material 70. Preferably, the underdrain block 10 is manufactured from a lightweight plastic to reduced shipping costs. The lid 20 can also be manufactured from an impervious, non-porous plastic material. After the underdrain block is at the filter site, it can be filled with filler material 70 that is available at that location, sand, gravel, stones, cement or concrete.

The top surface 30 of the underdrain block 10 preferably has a ridge 34 circumscribing the opening 15. As seen in FIG. 1, the lid 20 interlocks with the ridge 34 to enclose the filler material 70 within the underdrain block 10. In one preferred embodiment, the lid 20 comprises a top 22, a bottom 24 and a peripheral edge 26. The peripheral edge 26 comprises a rim 27 adapted to interlock with the ridge 34 of the block 10. In one embodiment illustrated in FIGS. 3 and 4, the ridge 34 of the underdrain block 10 includes a flange 35a, 35b perpendicular to the top surface. In this embodiment, the rim 27 is adapted to tightly fit over the flange 35a, 35b so that the rim 27 interlocks with the flange 35a, 35b.

Figure 4:
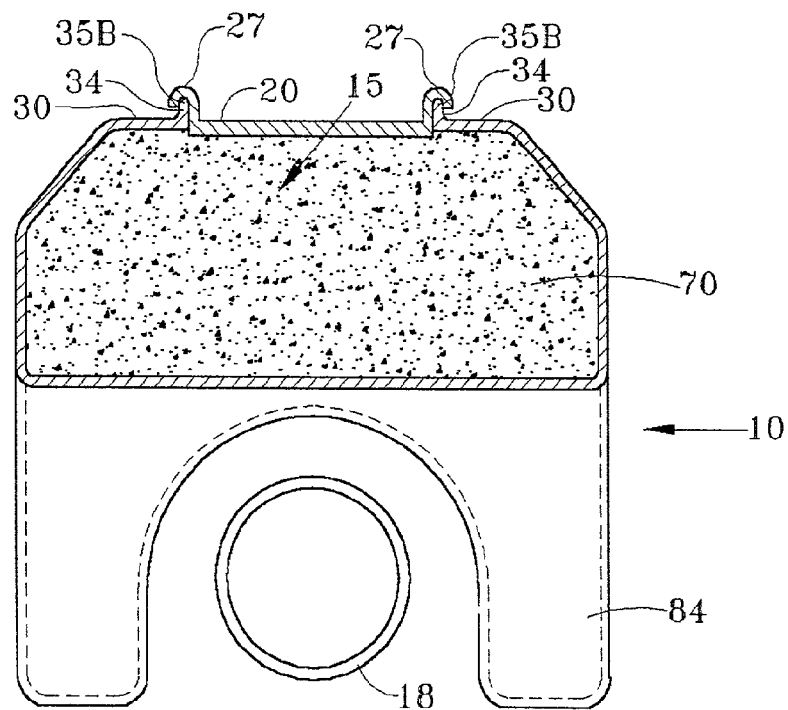
FIG. 4 is a partial cross-section of an underdrain block illustrating another embodiment of the ridge.
Figure 5:
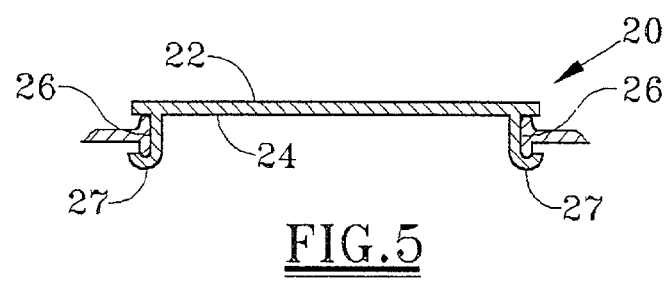
FIG. 5 is a cross-section of one embodiment of the lid.
Figure 6:
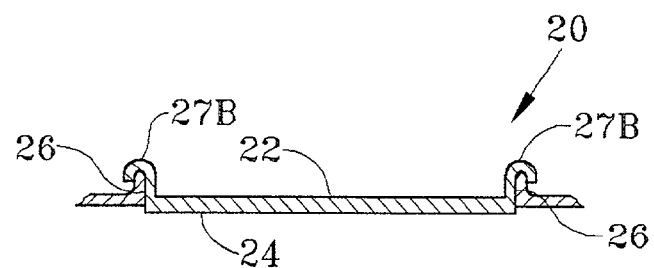
FIG. 6 is a cross-section of another embodiment of the lid.

As illustrated in FIG. 3, the flange 35a drops down from the ridge 34 so that it is positioned within the opening 15 of the underdrain block 10. In this embodiment, the rim 27 of the lid 20 is configured to be positioned within the opening 15 of the underdrain block 10 to interlock onto the flange 35a. FIG. 5 depicts a lid 20 wherein the rim 27a fits within the opening 15 to clamp onto the flange 35a. In an alternative embodiment as seen in FIG. 4 and FIG. 6, the flange 35b is directed away from the opening 15 of the underdrain block and the rim 27b is adapted to be positioned over the ridge 34 of the underdrain block to interlock onto the flange 35b. In either embodiment of the lid, the body of the lid snugly fits within the opening 15 of the top 30 of the underdrain block 10 so as to close it 15 off and retain the fill material 70 within the block 10. The shape of the lid 20 is adapted to accommodate the shape of the opening 15 of the block. Underdrain blocks typically range in size from about 18 to 25 inches in length and 6 to 10 inches in height. Openings in the top 30 of the block 15 can range from about 13 inches to about 18 inches in length and 3 inches to 5 inches in width. The size of the block and the opening can vary and such variations are within the scope of this invention. Preferably, the lid 20 comprises a size that is adapted to snap lock onto the ridge 34 when the lid 20 is fitted within the opening 15 of the underdrain block. The rim 27 can be sized to fit tightly onto the ridge 34. In one preferred embodiment, the rim 27 is u-shaped as seen in FIG. 5, alternatively, the rim can be shaped as an inverted "U" as in FIG. 6. In either embodiment, the u-shaped rim 27 defines a channel 28 to accommodate the flange 35 of the ridge 34. The rim 27 can comprise a sealing member 29 fitted within the channel 28. The sealing member 29 can comprise a bead of plastic sealing compound. Alternatively, the sealing member 29 can comprise an o-ring. In one embodiment as seen in FIG. 6, the bottom 24 of the lid 20 can have one or more protrusions 25 directed downward into the fill material which can anchor the lid 20 in the fill material.

In another preferred embodiment of a lid 20 for an underdrain block 10, the underdrain block includes a top surface 30 defining an opening 15 for receiving fill material 15, the top surface 30 forming a ridge 34 surrounding the opening 15. Preferably, the ridge 34 forms a flange 35a perpendicular to the top surface 30 and directed downward into the opening 15. The lid 20 comprises a top 22, a bottom 24, and a peripheral edge 26 having a u-shaped rim 27. The u-shaped rim 27 comprises a locking means configured to tightly fit over the flange 35a so that the rim 27 interlocks with the flange 35a. In one embodiment, the locking means is the size of the u-shaped rim 27. In this embodiment the channel 28 defined by the "u" is sized so that the rim 27 shape locks onto the flange 35a. Alternatively the channel 28 is fitted with a sealing member 29 so that a seal is formed when the rim 27 is fitted over the flange 35a. In an alternative embodiment as illustrated by FIG. 2A, the locking means comprises prongs 27a adapted to tightly engage with the ridge 34.

In any of the described embodiments, the lid 20 can be molded from an impervious plastic, preferably a plastic similar to the plastic forming the underdrain block.

An alternative embodiment of this invention is an underdrain block 10, as illustrated by FIG. 1, for a filter system comprising a hollow plastic housing 80 that is fillable with a particulate or curable material, and sealable with a lid 20. The housing 80 comprising a top wall 82, a bottom wall 87, and ends walls 86 and side walls 85 connecting the top wall 82 to the bottom wall 87, the bottom wall 87 forming two lateral rows of support legs 84 to provide for the infrastructure 18 for the filter system. Preferably, the top wall 82 defines an opening 15 and the remainder of the housing defines a cavity for receiving fill material 70. The top wall 82 can form a ridge 34 surrounding the opening 15. A lid 20 seals the opening 15 in the top wall 82 after the underdrain block is filled with filler material, sand or concrete. The lid comprises a top 22, a bottom 24, and a peripheral edge 26 that can be molded into a u-shaped rim 27. The u-shaped rim 27 can be the locking means to tightly fit over the ridge 34 so that that the rim 27 interlocks with the ridge 34.

In one embodiment of the underdrain block 10, the ridge 34 comprises a flange 35a perpendicular to the top surface 82 and directed downward into the opening 15. In this embodiment, the u-shaped rim 34a is the locking means and is configured to tightly fit over the flange 35a so that the rim 34a interlocks with the flange 35a. The u-shaped rim 34a defines a channel 28 accommodated to receive the flange 35a. A sealing member 29 can be fitted within the channel 28 to seal the rim 27a onto the flange 35a.

FIG. 7 depicts still another embodiment of this invention comprising a support system 100 for supporting granular filter media above a filter bottom, the filter bottom having an infrastructure 18. Preferably, the support system 100 comprises a layer of underdrain blocks 10 placed over infrastructure 18 of the filter bottom, each underdrain block 10 comprising a top 82 and a bottom 87 and a lid 20. In this embodiment, one or more porous plates 110 are placed over the underdrain blocks 10 to support the filter media. Anchoring means are required for securing the porous plates 110 to prevent the plates 110 from lifting up during high-pressure air and backwashes. In one embodiment, a lid 20 defines one or more bolt holes 63, a porous plate 110 defines one or more plate bolt holes 61 aligned to the bolt holes 63 of the lid 20 and the anchoring means comprises one or more bolts 64 threaded through the lid bolt holes 63 and the porous plate bolt holes 61 to secure the porous plate 110 to the lid 20. Alternatively, the anchoring means comprises expandable anchors threaded through the lid bolt holes 63 and the plate bolt holes 61 to secure the porous plate 110 to the lid 20. A Hilti® bolt is an example of an expandable anchor and readily available in the industry.

Figure 8:
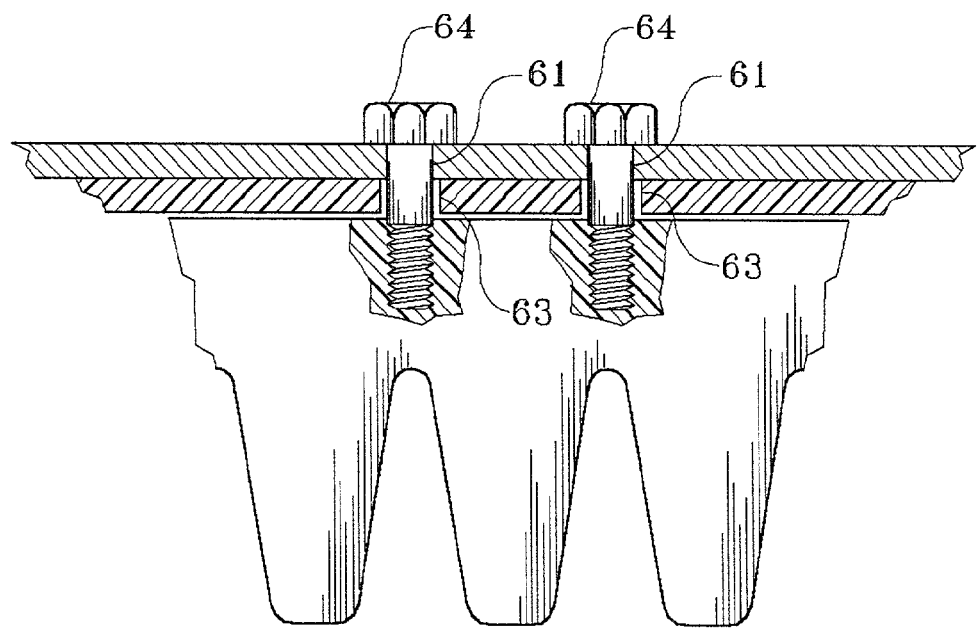
FIG. 8 is a cross-section of the underdrain block, the lid and the porous plate.

In an alternative embodiment of the support system, as illustrated in FIG. 8, the underdrain block comprises fill material and the anchoring means is anchored into the fill material 70. In this embodiment the fill material can be concrete or cement having threaded holes for receiving the bolts as illustrated in FIG. 8. After the underdrain block 10 is filled with the fill material, the lid 20 is locked in place to close the opening 15 and one or more porous plates 110 are placed over the lidded underdrain blocks 10 to support the filter media. The lid 20 defines one or more bolt holes 63 and the porous plate 110 defines one or more plate bolt holes 61 aligned to the bolt holes 63 of the lid 20. Anchoring means comprising one or more bolts 64 are threaded through the lid bolt holes 63 and the porous plate bolt holes 61 to then screwed into the threaded holes in the concrete to secure and anchor the porous plate. Cotter pins can be used to secure the bolts.

In still another embodiment of the support system, the underdrain block 10 comprises fill material 70 and the fill material 70 forms protrusions extending out from the top of the block. In this embodiment, the porous plate 110 defines a first set of openings, the lid defines a second set of openings aligned with the first set of openings in the plate, and the protrusions extend through the first and second set of openings and are secured with a securing mechanism such as a cotter pin to anchor the porous plate to the underdrain block. Alternatively, the anchoring means comprises anchors extending from the porous plate between the underdrain blocks and adapted to secure the porous plate to the infrastructure.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

The invention claimed is:

1. An underdrain block for a filter system comprising:
a hollow plastic housing;
the housing comprising a top wall, a bottom wall, and ends walls and side walls connecting the top wall to the bottom wall, the bottom wall forming two lateral rows of support legs to provide for the passage of fluid;
the top wall defining an opening for receiving a fill material, the top wall forming a ridge surrounding the opening;
a non-porous lid for sealing the opening in the top wall, the lid comprising a top, a bottom, and a peripheral edge, the peripheral edge comprising a u-shaped rim;
the u-shaped rim comprising a locking means to tightly fit over the ridge so that that the rim interlocks with the ridge.

2. The underdrain block of claim 1 wherein the ridge of the underdrain block comprises a flange perpendicular to the top surface and directed downward into the opening, and the rim comprises a size to fit tightly over the flange so that the rim interlocks with the flange.

3. The underdrain block of claim 2 wherein the u-shaped rim defines a channel and the rim further comprises a sealing member fitted within the channel to seal the rim onto the flange.

4. The underdrain block of claim 1 wherein the bottom of the lid comprises one or more protrusions for anchoring the lid in the fill material.

5. An underdrain block for a filter system, the underdrain block including a top surface defining an opening for receiving fill material, the top surface forming a ridge surrounding the opening, the ridge comprising a flange perpendicular to the top surface and directed downward into the opening, and a non-porous lid comprising:

a top, a bottom, and a peripheral edge, the peripheral edge comprising a u-shaped rim;

the u-shaped rim comprising locking means configured to tightly fit over the flange so that the rim interlocks with the flange, the u-shaped rim defining a channel and the rim further comprising a sealing member fitted within the channel to seal the rim onto the flange;

the non-porous lid comprising a size to snap lock onto the ridge so as to tightly close the opening.

6. The underdrain block of claim 5 wherein the bottom of the lid comprises one or more protrusions for anchoring the lid in the fill material.

7. An underdrain block for a filter system comprising:

a hollow, plastic housing;

the housing comprising a top wall, a bottom wall, and end and side walls connecting the top wall to the bottom wall, the bottom wall forming two lateral rows of support legs to provide for the passage of fluid;

the top wall defining an opening for receiving a fill material, the top wall forming a ridge surrounding the opening;

a non-porous lid for sealing the opening in the top wall, the lid comprising a top, a bottom, and a peripheral edge, the peripheral edge comprising a u-shaped rim;

the u-shaped rim comprising a locking means to tightly fit over the ridge so that the rim interlocks with the ridge;

the lid comprising a size to snap lock onto the ridge so as to seal the opening.

\* \* \* \* \*